J. F. Boynton.
Steam Generators.
No 3102.
Reissued Aug. 25. 1868.
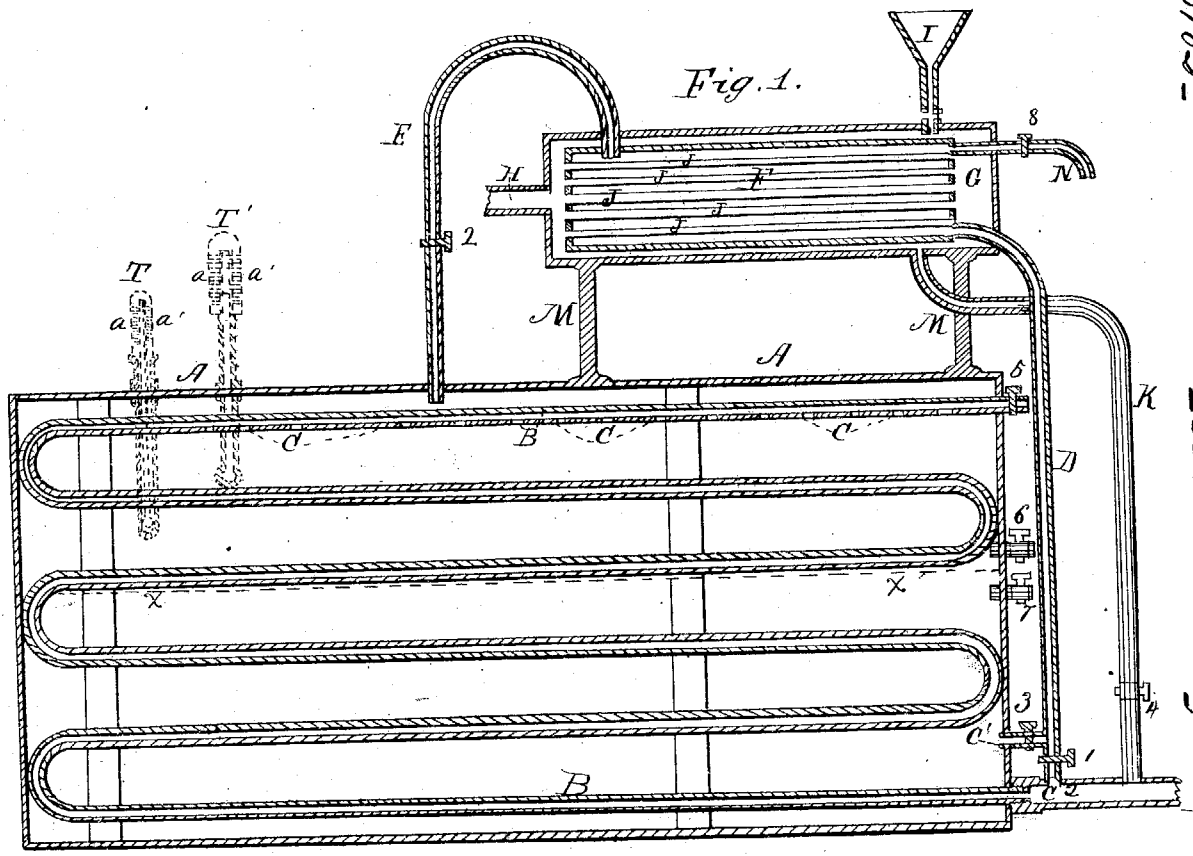
Witnesses
J. F. Coombs
Edw. F. Brown
Inventor
John F. Boynton

UNITED STATES PATENT OFFICE.

HENRI L. STUART, OF NEW YORK, ASSIGNEE OF JOHN F. BOYNTON, OF SYRACUSE, N. Y.

IMPROVEMENT IN STEAM-GENERATORS.

Specification forming part of Letters Patent No. 68,598, dated September 10, 1867; antedated July 19, 1867; Reissue No. 3,102, dated August 25, 1868.

DIVISION B.

*To all whom it may concern:*

Be it known that I, HENRI L. STUART, of the city and State of New York, by virtue of an assignment from JOHN F. BOYNTON, of Syracuse, New York, bearing date the 6th day of October, 1866, and duly recorded in the Patent Office, am the sole owner of certain Letters Patent for Improvement in Steam-Generators, granted to the said JOHN F. BOYNTON on the 10th day of September, 1867; that I deem the said patent inoperative and invalid by reason of a defective specification; and I do hereby declare that the following is a full, clear, and exact description of that part of the said invention included in this division.

The first part of the said invention, as set forth in this division, relates to a method of preventing steam-boilers from bursting; and it consists in a means for equalizing the temperature in all parts of the boiler. It is a well-known fact that steam, like air or gases, is a poor conductor of heat, so that steam in the upper or outer portion of a tube or steam chamber may be heated much higher than the steam in the boiler, and in the same manner a stratum of steam in the upper portion of the steam-space in the boiler may become much hotter than the lower portion of the steam which lies in contact with the water. Again, it is known that steam and gas will not convey heat downward as readily as upward, as the heat conveyed downward is by radiation, while heat conveyed upward is by translation of particles. As in the case of water, steam is a poor conductor of heat by radiation, but a rapid diffuser by translation of its atoms. It is believed that explosions of steam-boilers often occur from the steam in the upper portion of the steam-space becoming much hotter than that in the lower portion. It is not, however, the object of this specification to explain the theory upon which this inequality of temperature tends to produce explosions, but to describe the means of obviating such inequality.

The accompanying drawing represents a vertical section of a steam-boiler with internal pipes, and of an automatic heater and feeder attached thereto.

A is the outer wall of the boiler; B B, water and steam pipe running through the boiler from bottom to top; C, openings or jets in the upper portion of the pipe for the passage of steam or water. C′ is the induction-pipe for introducing feed-water into the boiler, and $C^2$ the induction-pipe for introducing water into the tube B. Dotted line *x x* shows the water-line in the boiler. The water being forced into the tube B through induction-pipe $C^2$ while passing through said tube B will be increasing in temperature until it passes the water-line, where it will begin to expand into steam, and will finally be discharged in steam-jets through the openings C in the upper stratum of steam in the boiler, thus securing an equilibrium of temperature in the steam throughout the boiler.

The second part of said invention, as set forth in this division, relates to an automatic heater and feeder, which I will now proceed to describe.

F is a reservoir, in which water is first heated by the exhaust-steam, and from which it is automatically fed to the boiler. E is a steam-pipe for equalizing the pressure in the boiler and the automatic reservoir F. H is the induction-pipe for the exhaust-steam; G, a chamber surrounding the automatic reservoir for heating the feed-water and condensing the escaped steam. I is the exit for uncondensed exhaust-steam; J, flues for the passage of escaped steam; D, a pipe for the passage of the water by its own gravity from the reservoir F to the boiler of the tube B; K, a pipe for conveying the water of the condensed steam to the force-pump; L, point for attaching force-pump; N, feed-pipe for supplying reservoir from a hydrant or from a cistern automatically by means of the vacuum formed by condensing steam when cocks Nos. 1, 2, and 3 are closed, and No. 8 open, and M M are supports for the automatic feeder. When cock 2 is opened, the pressure of the steam in the boiler and in the automatic reservoir will flow by its own gravity into the boiler through pipe D if cock 3 be opened, or into the tube B if cock 1 be opened. When cock 4 in pipe K is opened, the water of the condensed steam will flow down to the force-pump. It will be observed that when cock No. 1 is closed and cocks Nos. 2 and 3 open the water from the reservoir will pass directly into the boiler without traversing the tube B. When cock 3 is closed and 1 and 2 open, the water will pass into the tube B only; but when cocks 1, 2, and 3 are all open the water will pass from the reservoir into the boiler directly, and into the tube B at the same time. Before passing to the boiler or the tube B the water in the reservoir will be well heated by means of the exhaust-steam.

What I claim in this division as the invention of the said JOHN F. BOYNTON, and desire to secure by Letters Patent, is—

1. The perforated tube B within the boiler, or its equivalent, for equalizing the temperature of the steam in the boiler, substantially as described.

2. In combination with a steam-boiler, the automatic heater and feeder when constructed, arranged, and operating substantially as described.

HENRI L. STUART.

Witnesses:
WM. BARKER,
HORACE GREELY,
SAML. SMELAIR.